United States Patent
Parker et al.

(10) Patent No.: US 6,656,309 B1
(45) Date of Patent: Dec. 2, 2003

(54) LAMINATION-ASSISTED METHOD FOR DISPLAYING IMAGES BY WAY OF PLAQUES AND ACRYLIC FOR COMMENDATION, COMMEMORATION, INFORMATION, OR AWARD

(75) Inventors: Michael James Parker, Toronto (CA); Ronald James Hunt, Toronto (CA)

(73) Assignee: Custom Art Concepts Limited, Toronto (CA)

( * ) Notice: Subject to any disclaimer, the term of this patent is extended or adjusted under 35 U.S.C. 154(b) by 136 days.

(21) Appl. No.: 09/655,346

(22) Filed: Sep. 5, 2000

(51) Int. Cl.⁷ .............................................. B32B 31/20
(52) U.S. Cl. ........................ 156/249; 156/300; 156/289
(58) Field of Search ................................. 156/249, 289, 156/300, 182, 277, 288, 297, 306.6, 323, 152, 267, 235; 40/703, 760, 771, 773; 428/13, 14, 41.8, 42.1, 45, 46, 47, 172, 195, 209, 211, 542.2, 542.4, 542.6, 913.3, 44, 41.7; 238/67, 70, 109

(56) References Cited

U.S. PATENT DOCUMENTS

| | | | | |
|---|---|---|---|---|
| 4,197,151 A | * | 4/1980 | Muzik | 156/152 |
| 4,268,345 A | * | 5/1981 | Semchuck | 156/499 |
| 4,771,557 A | | 9/1988 | Bowman | |
| 5,380,044 A | * | 1/1995 | Aitkens et al. | 156/277 |
| 5,863,632 A | * | 1/1999 | Bisker | 156/163 |
| 6,040,026 A | | 3/2000 | Iwabuchi et al. | |

OTHER PUBLICATIONS

Webster's II New Riverside University Dictionary, 1984, Houghton Mifflin Company.*

* cited by examiner

Primary Examiner—Curtis Mayes
Assistant Examiner—Sing P Chan
(74) Attorney, Agent, or Firm—Deeth Williams Wall LLP

(57) ABSTRACT

The present invention provides a lamination-assisted method for preparing high quality plaques for the purposes of commemoration, commendation, information, or award, having the appearance and durability of metal plaques. This invention further provides a method which may be utilized for the preparation of acrylic block displays for commemoration, award, information, or commendation using lamination, whereby the impression is conveyed to an observer of an embedded image. In either case the text or graphic image, as imprinted on a carrier, is laminated to the display solid by using an adhesive film. An additional protective layer may then be laminated to the carrier.

7 Claims, 2 Drawing Sheets

LAMINATION-ASSISTED METHOD FOR DISPLAYING IMAGES BY WAY OF PLAQUES AND ACRYLIC FOR COMMENDATION, COMMEMORATION, INFORMATION, OR AWARD

BACKGROUND OF THE INVENTION

Display materials, such as commemorative plaques and awards, often comprise a metal plate mounted on a wooden base, and may be adapted to be hung on a wall or displayed on a desk or table. In some cases, the metal plate may be mounted on the base of a trophy or other award.

The use of such metal plates results in a distinctive, easy and "rich looking" award. The metal plate provides a smooth surface upon which the desired information may be readily displayed. One of its characteristics over other materials is that it acts as superior backdrop to almost any type of visual image as a result of its highly reflective surface. Furthermore, people prefer the effect of metal over paper due to the latter's actual and conveyed impressions of permanence and sturdiness. Metal gives to many users a feeling of superior quality. This is an accepted and popular means of commemorating or memorializing a special occasion or place, conveying important information, commending an individual or group of persons on some meritorious matter, or awarding someone for a laudable deed.

Such metal plates commonly contain written descriptive material which may simply be engraved or etched into the metal plate, resulting in only a one-colour display. In some cases, coloured lettering may be applied to such a metal plate by filling the engraved or etched letters with coloured ink or paint. It is also general practice, however, to apply coloured lettering by processes such as silk screening. Silk screening and other commonly used methods of applying coloured lettering requires the use of a separate printing step for each colour used, and requires careful alignment and registration of the screens required for printing.

Reproduction of photographs or other multi-colour artistic works on metal plates involves several printing steps, each using a single colour, and requires even more careful alignment and registration of each colour separation. Each such printing step requires the preparation of a separate screen or separation, which increases the cost and time involved in multi-colour printing processes. Consequently, multi-colour printing processes are generally used only when a large number of such plaques are being prepared.

Another popular means of commendation, information, commemoration, or award is the use of a substantial layer of a transparent material, most usually acrylic polymer or glass. A substantial piece of the transparent material is placed between the observer and the textual or graphic image. This is normally achieved by embedding the printed image within a block of the transparent material. The image would usually have a transparent background to the text or graphics, except for small regions to accentuate particular foreground colours. Both the block and the image background may be colour tinted. The block as a whole would then be adapted to be displayed under a variety of circumstances, e.g. hung on a wall, on a desk or shelf, or as part of an assemblage of displayed items The human perception of an image through a transparent medium as described above is that of suspension of the characters or graphics of the image. The phenomena of internal reflection and refraction occur as governed by the optical characteristics of such a block: to an observer, a quick impression is that of suspension in a clear liquid with reflectance off the walls of the block. Taken in entirety, this is esthetically pleasing and makes the finished product attractive as a means for displaying such images.

In its solid form, acrylic is a physically sturdy and chemically inert material, capable of withstanding hostile environments and treatment without significant damage. Together with its clear optical characteristic, which makes it suitable as a medium for display purposes, acrylic is often used for purposes of commendation, award, information, or commemoration. Glass has also been used but its physical characteristics are less appealing since it is more difficult to work with and requires greater care and attention in handling.

Conventional means of producing embedded displays of textual or graphic images involve a number of steps. The acrylic polymer material is heated to a liquid state which is then poured into individual moulds. A carrier bearing the text or graphic image is added to and carefully positioned in the acrylic material while the latter remains in the workable molten state. The carrier must be of a chemical composition such as to withstand the corrosive characteristics of liquefied acrylic; it must also be of such physical characteristics to bear up under the associated heat and pressure. This restricts the spectrum of possible materials that can be utilized to carry the image. For example, present conventional photographic paper could not be used. Furthermore the means of imprinting the text or graphic on the carrier must be carefully chosen due to the same reasons. A wide variety of methods of imprinting the image would not survive the chemical bath. The process as a whole is complicated and expensive, especially where lesser quantities of such displays are produced.

One way of circumventing the above mentioned problems while retaining the characteristic of embedded images is to mount the printed image at the rear of the acrylic block. As a result, the observer sees the image through the clear acrylic material and its visual effect is comparable to that of the embedded approach. The laminated films may be trimmed to minimize any raised edges and give the assembly the appearance of a close approximation to uniform constitution. As a result, there is no need for the acrylic material to be reduced to a molten state while affixing the printed image thus avoiding the difficulties of heating and corrosion on the carrier. This further results in the possible use of a greater variety of image films.

The choice of the method of preparing the display must not substantially impair the overall transparent characteristic of the acrylic block as a means of display relative to the conventional embedding methodology. A silicone-based adhesive, while fulfilling the visual effect requirement, is difficult to work with requiring considerable sophistication, and has significant toxicity.

The present invention provides a method for preparing high quality plaques having the appearance and durability of metal plaques, but which can be prepared much more quickly and economically than conventional metal plates. Furthermore, the method of the present invention permits the preparation of even single plaques having several colours or bearing photographic or other artistic works at a fraction of the cost of preparing metal plates.

The same method may be utilized for the preparation of acrylic block displays with comparable visual impact and durability as that produced through conventional embedding methodology, but the process is quick, simple, and less expensive, especially where lower quantities of displays are involved. Furthermore, the class of possible carriers is larger since there is virtually no similar requirement for heat and corrosion resistance as in the case of conventional embedding methodology.

REFERRING TO THE DRAWINGS

So that the invention may be better understood, the preferred embodiments thereof is described in detail by way of example, with reference to the accompanying drawings, in which.

DETAILED DESCRIPTIONS OF THE PREFERRED EMBODIMENTS

Figure 1:
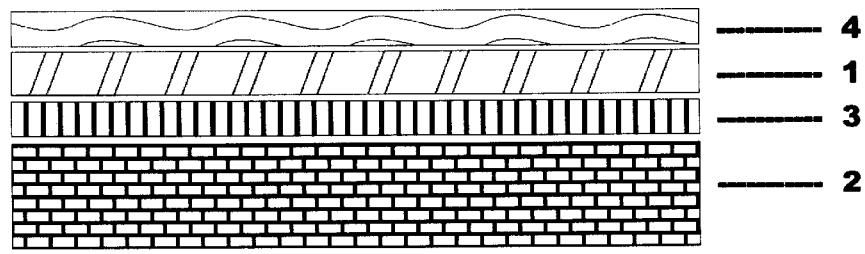
FIG. 1 is a side sectional view of a preferred embodiment of the present invention involving a metallic plaque.

In general, the display panel for purposes of commemoration, commendation, information, or award consists of a transparent film, also known as a carrier 1, upon which the text and/or images are printed, and a display solid 2 upon which the transparent film is mounted, as illustrated in FIG. 1. The transparent film 1 may be mounted to the display solid 2 by any convenient adhesive means, but is preferably mounted to the display solid by means of an optically clear mucilaginous film, known as an adhesive film 3, comprising of a transparent base film having adhesive coating on each side, which is laminated together with the carrier 1 and display solid 2. The display solid 2 may be an acrylic block, or a metallic plate mounted on any suitable backing or support surface, but is preferably such as a wooden or stone block for purposes of commemoration, award, information, or commendation. In the case of an acrylic display solid 2, one embodiment uses a clear block, without colouring; another comprises the employment of a colour tinted block.

The printed, transparent carrier 1 may be optionally protected by a thick clear transparent film, also known as a protective laminate 4, which is adhesively mounted to the carrier 1. An alternative to a clear transparent protective laminate comprises one with a matte finish in the case where the display solid is a metallic plaque. Other alternatives such as a satin or glossy finish may also be used. The preferred embodiment uses a protective laminate 4 with an adhesive coating and a release liner on one side.

Figure 4:
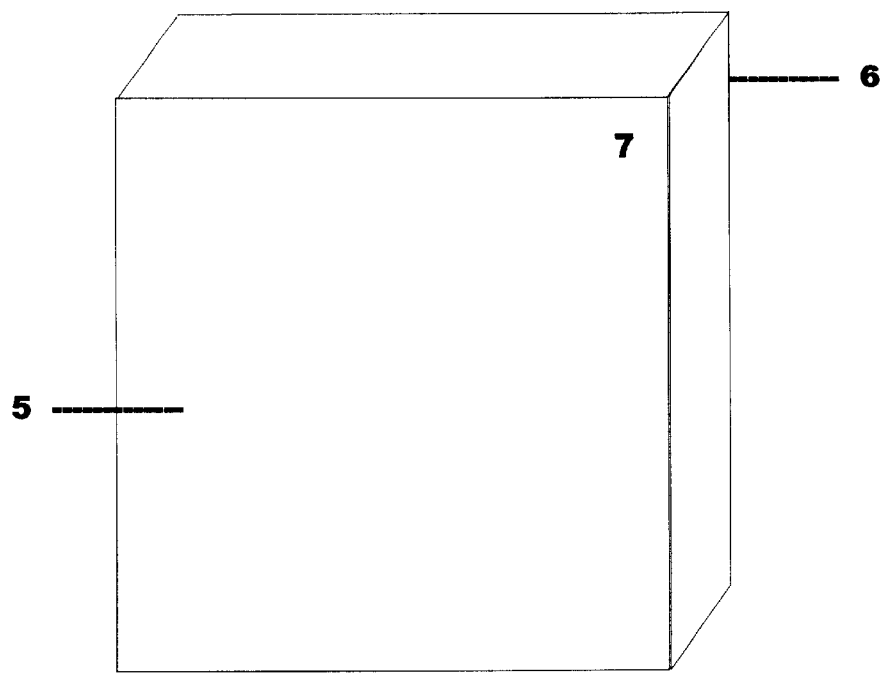
FIG. 4 is a perspective view of a fully assembled, preferred embodiment of the present invention involving an acrylic block.

With another embodiment of the invention, carriers 1 printed with the text or graphic are mounted onto the front 5 and back 6 of an acrylic block 7 (block shown in FIG. 4). The carriers 1 is preferably laminated under pressure to the acrylic block 2 together with an adhesive film 3.

With another preferred embodiment, the carrier 1 and the protective laminate 4 (as a laminated assembly) are mounted on the rear 6 of the acrylic block 7.

Figure 3:
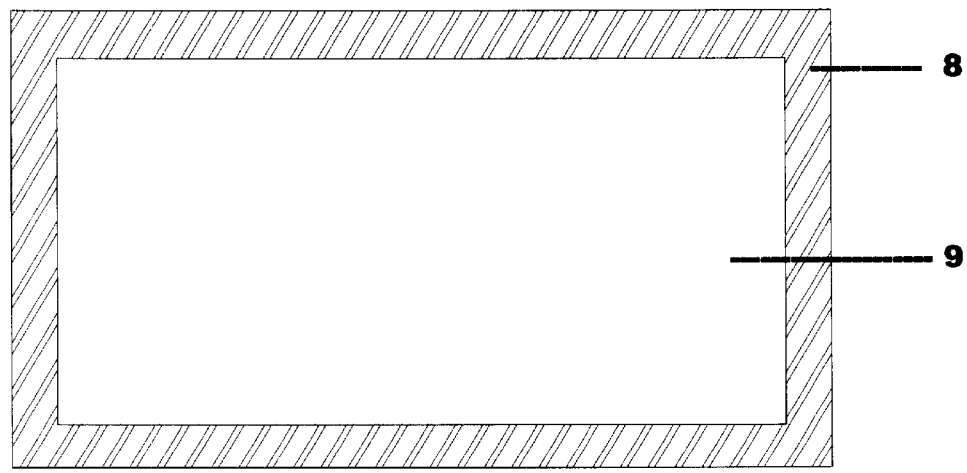
FIG. 3 is a front perspective view of a fully assembled, preferred embodiment of the present invention involving a metallic plaque.

In another preferred embodiment of the invention involving a metallic plaque display solid 2, the carrier 1 and protective laminate 4, if any, cover only the centre portion 9 of the metallic surface, leaving exposed a narrow shiny border 8 (see FIG. 3). This adds a degree of contrast to the plaque enhancing the overall aesthetic appeal of the plaque.

The details of the above preferred embodiments follows. The first stage in the preparation of the laminated assembly of the present invention is preferably the printing of the desired subject matter, which may include the text, photographs, artistic drawings, or other graphic representations, on the carrier 1, which may be a clear or a tinted acetate type material, and which may be imprinted by any conventional, appropriate means, such as laser printing, ink jet printing, photocopying, silk screening, or other conventional printing processes. The surface of the acetate-like material is preferably uncoated such as to eliminate the possibility of a chemical reaction between any such coating and the adhesive, resulting in "peeling" or degradation of the printed image. This will rule out certain printing technologies which make use of chemically coated carriers.

Figure 2:
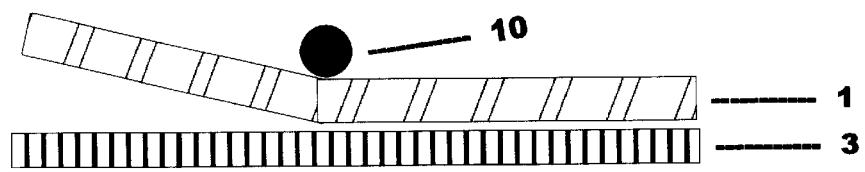
FIG. 2 is a side sectional view of a partially assembled preferred embodiment of the present invention, depicting a preferred method of lamination of the pressure-sensitive mounting adhesive to the display solid.

Following the application of the printed material to the carrier 1, the carrier 1 may be laminated to an adhesive film 3 (see FIG. 2). Such an adhesive layer 3 is generally available in roll or sheet form, and comprises a two sided adhesive, each side of which is protected by a clear release liner, which is easily removed from the adhesive surface. The carrier 1 is applied to the adhesive film 3 by removing the release liner from one side of the adhesive film 3, and aligning the printed surface with the adhesive layer. Once proper alignment of the carrier 1 and the adhesive film 3 is achieved either manually or mechanically, the two materials are fed into the roller 10 of the laminator under pressure, to remove any air that may be trapped between the two layers. Alternatively, the release liner may be removed stepwise while feeding the carrier 1 and adhesive film 3 into the laminator roller 10. This lamination is conveniently accomplished through the use of conventional cold lamination; alternatively heat-assisted lamination may also be utilized.

One variation to the above is that the surface of the area of the laminator feeding the sheets into the laminating roller 10 is preferably one that allows slippage of the sheets as such are fed into the roller 10 of the laminator. For example, the material masonite coated with silicone, through one of various means, is one that is found to suit this purpose.

The printed surface may be protected by the application of a clear laminated upper surface 4, also known as a protective laminate, generally of polyvinyl chloride, polyester, polypropylene, or other scratch-resistant material, which is generally available in a sheet or roll form having a pressure-sensitive adhesive on one side of the film covered by a release sheet. This protective laminate 4 may be clear, as for the case of acrylic blocks, or other types of finish, e.g. glossy, satin, or matte. It may incorporate an inhibitor for radiation in the ultra-violet range of the electromagnetic spectrum, in order to prevent fading of the printed image on the carrier 1 as a result of exposure to sunlight. Such PVC materials are commonly available. As in the mounting of the carrier 1 to the adhesive film 3, the carrier 1 is preferably aligned with the protective laminate 4, and, when properly aligned, the protective laminate 4 and the carrier 1 are fed into the rollers 10 of the laminator and cold laminated under pressure to activate the pressure-sensitive adhesive.

The orientation of the desired subject matter, as such are printed on the carrier 1, is dependent to some extent on the presence or absence of a protective laminate layer 4 in the finished laminated assembly. If there is no protective laminate 4, then the orientation must be chosen to avoid exposing the printed surface of the carrier 1 to the exterior. In the case where a protective laminate 4 is employed, the orientation makes little difference due to the presence of the protective laminate 4. Printing in the reversed orientation on the carrier 1 should take place if there is no protective laminate 4 in the case of a frontal mounting, since the printed image surface would otherwise lie exposed. On the other hand, normal imaging orientation must take place if there is no protective laminate 4 where the carrier 1 is mounted at the rear of an acrylic block 7. This way, the printed surface is on the side facing the acrylic block 7.

Upon lamination of the protective laminate 4, if any, to the carrier 1, the assembly may be laminated to a display solid 2 comprising a metal sheet, heavy paper, card stock, plastic material, wood, acrylic, or other suitable materials. This lamination is. accomplished by removing the remaining release layer from the pressure-sensitive adhesive film 3, and aligning the assembled layers in the desired location on the display solid, and then laminating the display solid 2 to the printed assembly, using conventional cold or hot lamination.

In other preferred embodiments of the invention, the precise procedure for each laminating stage is unchanged but their order is varied. The successive layers to be laminated together are: the display solid 2 on the bottom, the carrier 1, the adhesive film 3, and the protective laminate 4 on the top, if any. As long as the successive order of the layers is preserved in the final laminated product as indicated, the order of the laminations makes no difference. This is to say, one has three choices as the first step: laminate the display solid 2 to the bottom surface of adhesive film 3 before all other laminating steps, or commence with lamination of the carrier 1 to the top surface of the adhesive film 3, or even start with adhering the top surface of the carrier 1 to the protective laminate 4. The next step has two choices, depending on the initial choice. The order is a function of convenience and the particular equipment used in the lamination processes. Since working on the display solid 2 with a roller laminator likely constitutes the most delicate part of the process due to the application of pressure on a 3-dimensional solid, mounting an otherwise completed assembly onto the display solid 2 is preferably the last step. The exposure of an unstable print medium, certain types of ink for example, on the carrier 1 to the laminator roller 10 is another reason that lamination should normally be the last step. However, experience shows that lower wastage of work materials results in the case of metallic plaques without an exposed metallic border if the adhesive film 3 is applied to the metallic display solid 2 first.

The terms "assembly", "structure", "complex", and "composite" are used interchangeably to indicate two or more layers laminated together as an intermediate in the production process resulting in a final laminated product consisting of all four layers (or three if a protective laminate is not used).

Another embodiment would involve adhesive coating on the carrier instead of the adhesive film to bind the carrier to the adhesive film. Thus one is using an adhesive film with mucilage on the side adhering to the display solid. The same could also apply in a variation for the carrier and protective laminate bonding: it is the carrier that is initially coated with an adhesive (and a release liner) and not the protective laminate. One practical constraint is the vulnerability of the image medium, e.g. the ink, to chemically react with the adhesive.

Intermediate and finishing steps in the preparation of the assembled display may include careful trimming of any of the desired layers for esthetic appeal.

It will be appreciated that the above description relates to the preferred embodiments by way of example only. Many variations on the apparatus for delivering the invention will be obvious to those knowledgeable in the field, and such obvious variations are within the scope of the invention as described and claimed, whether or not expressly described. As an example, it is the alternative practice of those in the field to use heat-assisted lamination and attending lamination materials instead of cold lamination as indicated above. The employment of heat on the laminated assembly occurs either during the application of pressure by the use of a heat roller laminator or subsequent to its application by a heat press. Experiments show that good results are achieved with adhesives generally available in Canada in the approximate temperature range between 80° C. and 120° C. Substantially below this range, peeling of the laminated layers occurs; above this range, there is considerable scorching of the adhesive film 3 and the protective laminate 4, if any.

SUMMARY OF THE INVENTION

It is an object of this invention to provide a method for preparing high quality plaques having the appearance and durability of metal plaques. These plaques are used for the display of text or graphic images for purposes of commemoration, commendation, information, or award. Furthermore, the method of the present invention permits the preparation of even single plaques having several colours or bearing photographic or other artistic works at a fraction of the cost of preparing metal plates.

It is another object of this invention to provided a method for the preparation of acrylic block displays with comparable visual impact of embedded text or graphic images as that produced through conventional embedding methodology. Furthermore, the class of possible carriers is larger since there is virtually no similar requirement for heat and corrosion resistance as in the case of conventional embedding methodology.

A further object of this invention is to provide a method of the aforementioned character, but which is much quicker, simpler, and economical than conventional methods, especially where lower quantities of displays are involved.

The embodiments of the invention in which an exclusive property or privilege is claimed are defined as follows:

1. A method for producing a visual display of an image carried by a planar carrier having a top surface and a bottom surface using a display solid for purposes of commendation, commemoration, information, or award, comprising the steps of:
    (a) laminating together, using a laminator and a surface area comprising a masonite sheet coated with silicone for feeding to a laminating roller of said laminator, a composite comprising a protective laminate, the carrier, and an adhesive film having a top surface and a bottom surface, and;
    (b) laminating the composite to the display solid.

2. The method of claim 1, wherein the step of laminating together the composite comprising a protective laminate, the carrier, and an adhesive film having a top surface and a bottom surface further comprises the steps of:
    (a) laminating an assembly the assembly comprising the protective laminate and the carrier; and
    (b) laminating the assembly to the adhesive film.

3. The method of claim 2, wherein the step of laminating an assembly comprises the steps of:
    (a) removing a release sheet on the protective laminate exposing a pressure-sensitive adhesive coating;
    (b) superposing one of the protective laminate and the carrier with the other, having the exposed adhesive coating of the protective laminate facing the carrier; and (c) laminating by applying pressure using the laminator to the protective laminate and the carrier.

4. The method of any one of claims 1 to 3, wherein the finish of the protective laminate comprises one selected from the group comprising transparent, matte, satin, and glossy.

5. The method of any one of claims 1 to 3, wherein the display solid comprises one selected from the group consisting of a metallic plate mounted on a solid base, a metallic plate, a wooden block an acrylic block, a glass block, and a plastic block.

6. The method of any of claims 1 to 3, wherein the carrier comprises a sheet selected from the group consisting of acetate, paper, and photographic paper.

7. A method for producing a visual display of an image carried by a planar carrier having a top surface and a bottom surface using a display solid for purposes of commendation, commemoration, information, or award, comprising the steps of:

(a) removing a release sheet on a protective laminate exposing a pressure-sensitive adhesive coating;

(b) superposing one of the protective laminate and the carrier with the other, having the exposed adhesive coating of the protective laminate facing the carrier; and (c) laminating together an assembly by applying pressure, using a laminator and a surface area comprising a masonite sheet coated with silicone for feeding to a laminating roller of said laminator, to the protective laminate and the carrier;

(d) laminating together the assembly and the adhesive film to form a composite; and (e) laminating the composite to the display solid.

\* \* \* \* \*